July 31, 1945. R. L. BEASECKER 2,380,573
APPARATUS FOR FABRICATING PLYWOOD STRUCTURES
Filed April 10, 1943 2 Sheets-Sheet 1
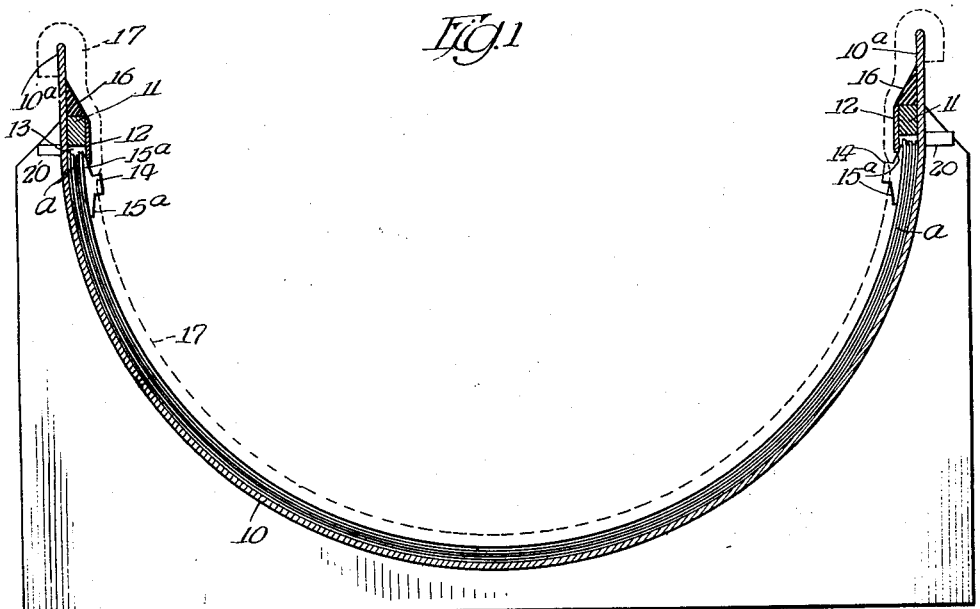
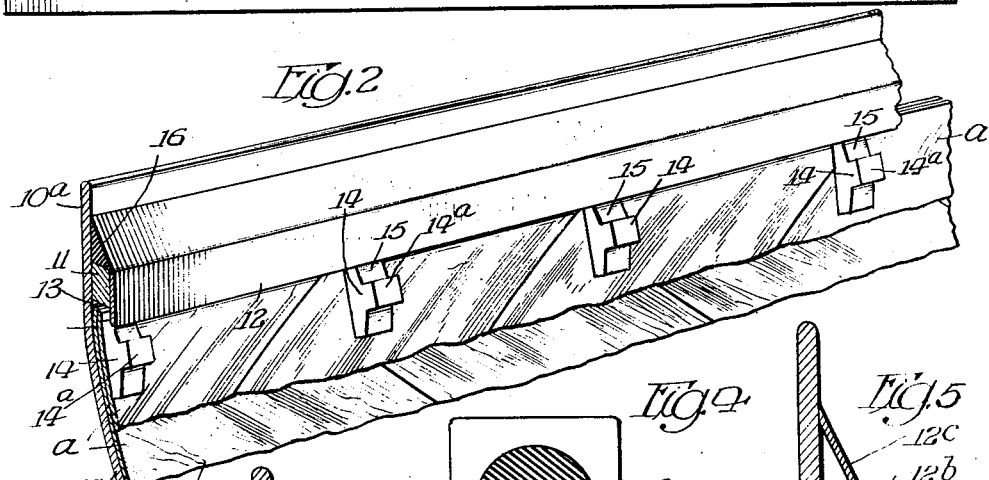
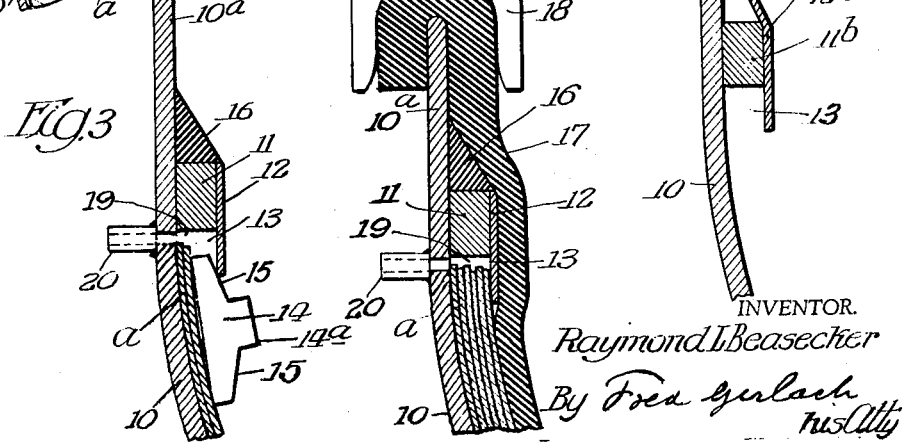
INVENTOR.
Raymond L. Beasecker
By Fred Gerlach
his Atty July 31, 1945.　　R. L. BEASECKER　　2,380,573
APPARATUS FOR FABRICATING PLYWOOD STRUCTURES
Filed April 10, 1943　　2 Sheets-Sheet 2
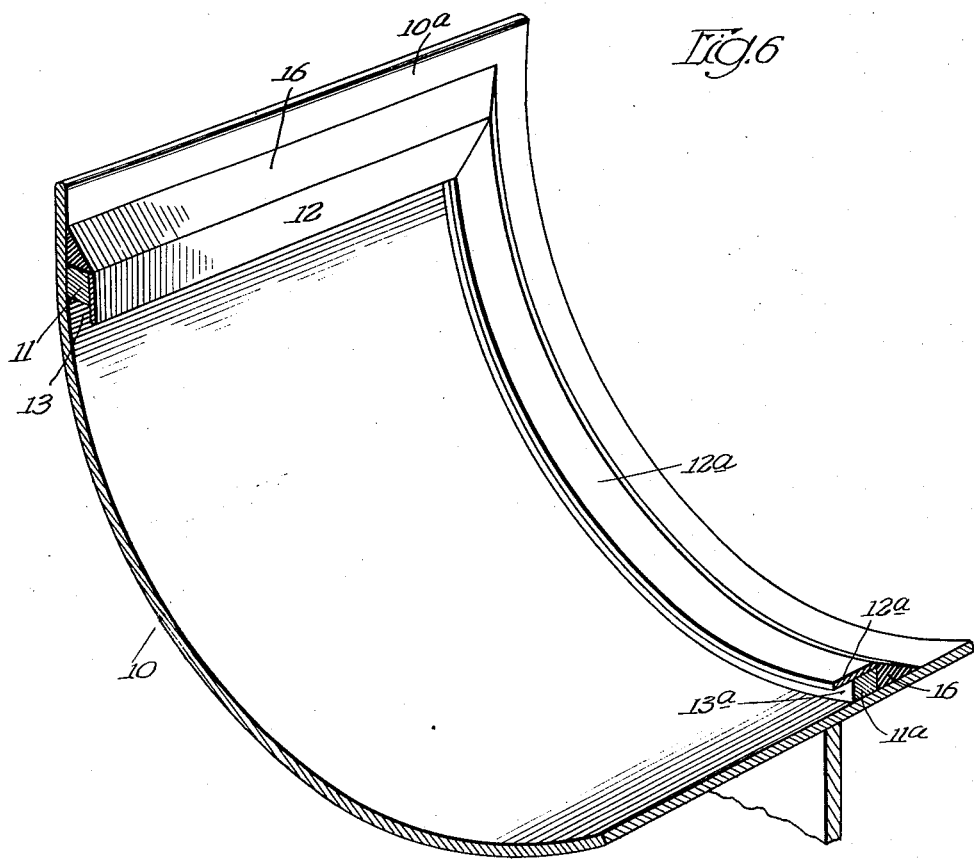
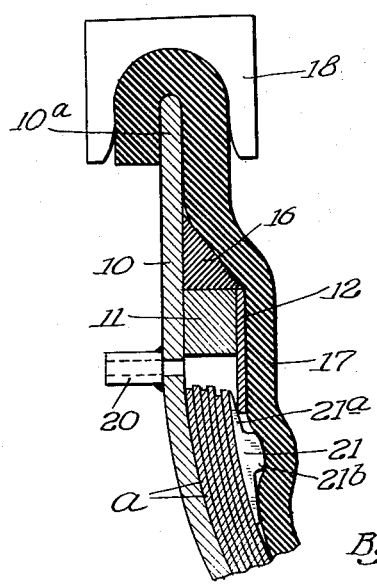
Inventor
Raymond L. Beasecker Patented July 31, 1945

2,380,573

UNITED STATES PATENT OFFICE 2,380,573

APPARATUS FOR FABRICATING PLYWOOD STRUCTURES

Raymond L. Beasecker, Grand Rapids, Mich., assignor to Haskelite Manufacturing Corporation, Grand Rapids, Mich., a corporation of New York Application April 10, 1943, Serial No. 482,574

6 Claims. (Cl. 144—281)

The invention relates to the fabrication of plywood structures.

In the fabrication of plywood structures, such as shells or panels, it is necessary to assemble, in superposed relation, sheets or strips of wood veneer to form layers or plies of the required number until the assembly has the thickness desired for the structure. The directions of the grain of the veneer in the alternating layers or plies are usually arranged perpendicularly to one another. In fabricating structures of large area sheets or strips of wood veneer are assembled together in edgewise relation to form each ply or layer. The sheets and layers are progressively assembled in or on a rigid mold or die. The assembled plies or layers are then subjected to heat and pressure while forced against the rigid mold or die member for thermo-setting of the interleaved glue and molding the structure to the desired contour. In this fabrication it is important to assemble the sheets or strips of each layer or ply in correct edgewise relation in or on the mold or die and to maintain the sheets against displacement from that relation until the assembly of sheets has been completed and is in readiness for permanent bonding. Disarrangement or displacement of the sheets while they are being assembled in or on the die or mold may cause gaps or overlapping between the edges of the sheets or an uneven or imperfect structure.

The invention contemplates a method of, and apparatus for, assembling the sheets and plies or layers of a panel preparatory to the molding operation, and progressively securing the margins of each of the sheets to the die or mold member on which they are assembled so that there will be no displacement during the progressive superposing of the sheets and layers on the previously assembled sheets or plies, and maintaining the assembly of sheets clamped to the mold or die until the thermo-setting and molding operation is performed on the assembled mold or die and the superposed sheets.

One object of the invention is to provide an improved method of fabricating plywood by which the margins of the sheets after being placed in the mold are firmly clamped to the mold to prevent displacement during the completion of the assembly of the sheets and while the sheets of successive layers are superposed on those of the previously laid ply or plies so that the sheets will remain in correct relation to one another until the assembly is ready for permanently bonding and molding of the sheets by thermo-setting the interleaved glue. This method results in the production of plywood panels or shells in which the sheets are bonded together in their intended and correctly assembled relation.

Another object of the invention is to provide apparatus for progressively clamping the sheets of each ply to the die or mold as soon as they are correctly positioned in the mold in forming a ply and for clamping the sheets of each superimposed ply to the mold and to the previously placed sheets so that the sheets of all of the plies, after placement in or on the mold or die, will be firmly held against displacement until pressure and heat for permanently bonding the sheets together to form a shell or panel are to be applied.

Another object of the invention is to provide a simple apparatus for this purpose which is adapted for use with an elastic or rubber blanket through which the pressure is applied against the assembled plies in the die or mold and which is adapted to be sealed to the margin of the die or mold, without substantial shear stresses on or cutting the elastic material forming the blanket.

A still further object of the invention is to provide a rigid mold or die with means around its margin for receiving the marginal portions of the superposed sheets and with means forming a channel around the margins of the sheets to facilitate the exhaust by suction of air from the space between the blanket and the mold.

Other objects of the invention will appear from the detailed description.

The invention consists of the several novel features which are hereinafter set forth and more particularly defined by claims at the conclusion hereof.

In the drawings:

Fig. 1 is a transverse section of a mold for use in fabricating a curved plywood panel or shell, and exemplifying the invention with a partial assembly of the sheets of veneer, and the wedge-clamps for securing the sheets on the mold, the elastic blanket for subjecting the complete assembly of plies of veneer to pressure, after the clamps have been removed, being shown in dotted lines.

Fig. 2 is a sectional perspective illustrating the manner of the assembling and clamping of the sheets in the mold.

Fig. 3 is a section of one side of the mold and a wedge-clamp for securing the superposed sheets forming the plies in the mold during the progressive placement of the sheets to form the additional plies of the panel.

Fig. 4 is a section illustrating the completed assembly of the plies in the mold and the elastic blanket around the mold.

Fig. 5 is a section of a modified form of the invention.

Fig. 6 is a perspective of one end portion of the fixed die member.

Fig. 7 is a section illustrating a wedge-clamp which may be left in the die under the blanket during the thermo-setting operation.

The invention is exemplified for molding a curved plywood panel or shell so it will permanently conform in contour to a rigid mold or die member 10 on or in which the plies of veneer are progressively laid to form a panel or shell with the desired number of plies, with the use of an elastic or rubber blanket 17 through which pressure is applied to the plies for thermo-setting of suitable dried liquid resin glue between the plies. These panels may be of any size and shape in accordance with the mold. Each ply of veneer is usually formed of relatively narrow sheets of veneer with parallel side edges cut with the grain and ends cut on an angle of approximately 45° across the grain, as illustrated in Fig. 2, and the sheets are secured together according to the desired contour of the panel, which when laid together, extend over the inner face of member 10 according to its area and shape. The sheets between the corner pieces extend diagonally across the member 10. The sheets of alternate plies are assembled with the grain at right angles to one another. In this arrangement two ends of each sheet are extended to two of the margins of each ply or layer.

The invention comprises means for progressively securing the margins of each ply to and along each side and the ends of the rigid mold member 10 during the assembly of the sheets into plies, and is exemplified by rigid steel bars 11 which are secured, for example by welding, to the inner face of the die or mold member 10 in parallel relation to and inwardly of the side-edges of the member 10, and similar bars 11$^a$ welded to the inner face of member 10 in parallel relation to and inwardly of each end of member 10. Each bar 11 has a strip 12 which may be integral with, or welded thereto, which forms with said bars an undercut channel 13 between its strip 12 and the member 10. Each bar 11$^a$ has a similar strip 12$^a$ which forms an undercut channel 13$^a$ along one of the ends of the mold. The open sides of these channels 13, 13$^a$ face inwardly for insertion of the opposite side margins of the sheets of veneer $a$ under the projecting portions of strips 12, 12$^a$ at the sides and ends of the mold. In placing the sheets diagonally in the mold as described, two ends of each will extend into undercut channels. Clamps 14, each having oppositely tapered wedges 15 at their ends and a central abutment 14$^a$ are adapted to be driven between the margins of strips $a^1$ forming the sheets $a$ in the channels 13, 13$^a$ and the strips 12, 12$^a$ around the sides and ends of the mold for securing the side and end margins of the strips forming the sheets $a$ against displacement in the mold and relatively to one another. The bars 11, 11$^a$ and strips 12 form channels for receiving all of the margins of the sides and ends of the assembled plies.

In assembling the sheets $a$ for fabricating the panel or shell, they are individually and successively placed in the mold for each ply. The triangular sheet for one end of the first or outer ply is placed in a corner of the mold with its margins extending into the channels 13, 13$^a$ along one side and end of the mold. The sheet will then be pressed snugly to fit the inner surface of the mold with its side margins in said channels. These margins are then secured in the mold by the successive placement of wedges 14 at a fixed number of points to clamp the sheet against the concave face of rigid member 10 and displacement in the mold. The next sheet of the same ply will then be diagonally placed in the mold in edge to edge relation with the previously secured sheet, and its margins will be secured by wedges 14 in the channels 13, 13$^a$. Additional sheets, which extend between the channels 13 along opposite sides of the mold, and corner sheets will be placed and secured by wedges in channels 13, 13$^a$ to the opposite end of the panel until the ply is completed and covers the entire inside face of member 10. Each sheet will have two marginal portions secured in the channels. The margins of all of the sheets $a$ in this layer will then be secured against displacement in the mold and conform to the shape of the mold. Next, the sheets for forming the second ply or layer of the panel will be individually and successively placed on the first layer and progressively secured by wedges in the same manner on the sheets of the first ply. The wedges holding the sheets of the first layer will be individually removed or loosened only as much as necessary to permit the margins of the veneer of the second ply to be successively inserted into the channels 13, 13$^a$ in the same manner as the first layer. The wedge-clamps are successively tightened to clamp the sheets of the first and second layers in the mold. In securing the second layer in the mold the wedges are successively loosened only in the number necessary for the insertion of the successive placement of margins of the veneer into the channels 13, 13$^a$, so that some of the wedges will always secure the underlying sheets during the placement of and securing of the sheets of the next ply in the mold. Successive layers will be similarly placed and secured by the wedges in the mold. This procedure will be continued until all of the plies or layers desired in the panel are assembled and secured in the mold. Sheets of thermo-setting glue are placed between the layers during this assembly of the sheets or the sheets may be coated with dried liquid resin glue, as well understood in the art, for bonding the plies together during molding. As the layers increase, clamps 14 with thinner wedges 15$^a$ are substituted for the thicker wedges used for clamping the sheets of the first several groups of layers in the mold.

When all of the layers desired have been assembled and are thus clamped in the mold, the assembly will be so kept until immediately before it is subjected to heat and pressure for thermo-setting the glue between the layers. The mold member 10 projects beyond the bars 11, 11$^a$ to provide a projecting marginal portion 10$^a$. An inclined surface 16 extends from the exposed face of the strip 12 to the inner face of the member 10 and is preferably formed by a filling of elastic or plastic material.

An elastic blanket 17 is then placed over the exposed face of the assembly of plies and laid over the bars 11 and strips 12, and its side margins are looped around the marginal portions 10$^a$ of the mold member 10. While the plies of veneer are all in position, the flexible blanket is carefully laid in the mold and on the topmost ply and adjusted into its correct position. This blanket is usually so heavy that its weight will hold the veneer against displacement in the mold, if the blanket is not displaced. The edges of the blanket are lifted locally and the workmen insert their hands under the blanket and successively remove the wedges. After this is done, the lapped margins of the blanket are secured to the side and end edges of member 10 by clips 18. The blanket will then form a seal between its sides and ends and the member 10 to completely enclose the assembled veneer. When the construction of wedges shown in Fig. 7 is used, the clamps may be left under the blanket. The margins of the veneer are usually somewhat irregular and leave an air space 19 around them in the channels 13, 13$^a$. The mold is provided with a nipple 20 for connection with a suitable source of suction or vacuum to draw air from the sealed space between the blanket 17 and the mold member 10.

The chamber 13 along the sides of the mold and the channels 13$^a$ at the ends of the mold form a continuous air space 19 around the margins of the assembled veneer to facilitate the exhaust of air from all the margins of the assembled plies when only one or two exhaust connections 20 are used. The suction or partial vacuum created in the space between the fixed section 10 of the mold and the blanket causes the veneer to be pressed against and to conform accurately to the shape of the face of the fixed section of the mold. In the event of a slight leakage the suction insures an effective pressure on the veneer during the thermo-setting operation.

When the blanket, mold member 10 and the veneer have been assembled, the entire assembly is moved into a tank where it is subjected to pressure and heat, for thermo-setting the glue and permanently bonding the plies together and molding them to the desired contour. Before placing the assembly in the tank, and if desired, while it is in the tank, air is exhausted from the sealed space between the blanket 17 and the die member 10 so that the veneer will be pressed evenly against all portions of the member 10. The air space 19 in the channels 13 facilitates the exhaust of air uniformly from all portions of the sealed space between the blanket and the die member. The inclined surfaces 16 avoids sharp bends in the rubber blanket. Such bends, in practice, result in early wear or deterioration of the rubber in the blanket.

A modification is illustrated in Fig. 5 in which the channel 13 for the marginal portion of the plywood sheet is formed by a bar 11$^b$ which is welded to the mold member 10, and a strip of metal 12$^b$ which forms one side of the channel 13 and is also extended to provide the inclined surface 12$^c$ for preventing sharp bends in the blanket when it is attached to the mold member.

Wedge-clamps 21 which can be left in the mold and under the blanket during the molding of the panel, as illustrated in Fig. 7, are provided with thin wedges 21$^a$ and a rounded abutment 21$^b$. The blanket 17 may be laid over these wedge-clamps without being cut by the wedges during the thermosetting operation.

The invention exemplifies a method of assembling sheets in a mold or die for forming the layers or plies of plywood structures in which the strips of the sheets of each ply are firmly secured against displacement while the sheets for the remaining plies or layers are assembled and superposed in the mold, and the latter are in turn secured against displacement until the sheets for the entire series of plies have been assembled in the mold. The invention also exemplifies simple apparatus for fabricating plywood which includes a device for progressively securing the veneer in place on the mold and preventing displacement during the progressive addition of the sheets to form the remainder of the ply. The invention also exemplifies a device of this character which avoids sharp bending or wear on the elastic or rubber blanket which forms the closing member for the mold. The invention also provides a device which forms a channel around the margin of the assembled plies which facilitates the exhaust of air from the space between the fixed and elastic mold members.

The invention is not to be understood as restricted to the details set forth since these may be modified within the scope of the appended claims without departing from the spirit and scope of the invention.

Having thus described the invention, what I claim as new and desire to secure by Letters Patent is:

1. Apparatus for molding plywood comprising a rigid die or mold member, means forming channels along the margins of said member for receiving and lapping the margins of superposed sheets of veneer for forming the plies, means removably fitting in the channels for clamping the margins of the superposed sheets in the channels together and to said member as they are progressively assembled on said member, an elastic blanket fitting over the exposed face of the superposed plies and overlying and projecting beyond the channel-forming means, and means for securing the marginal portion of the blanket to said member around the channel-forming means.

2. Apparatus for molding plywood comprising a rigid die or mold member, means forming channels along all of the margins of said member for receiving and lapping the margins of superposed sheets of veneer for forming the plies, means removably fitting in the channels for clamping the margins of the superposed sheets in the channels together and to said member as they are progressively assembled on said member, an elastic blanket fitting over the exposed face of the superposed plies and overlying and projecting beyond the channel-forming means, and means for securing the marginal portion of the blanket to said member around the channel-forming means.

3. Apparatus for molding plywood comprising a rigid die or mold member, means forming undercut channels along and inwardly of the margins of said member for receiving and lapping the margins of superposed sheets for forming the plies, means removably fitting in the channels for clamping the margins of the superposed sheets in the channels together and to said member as they are progressively assembled on said member, an elastic blanket fitting over the exposed face of the superposed plies and overlying and projecting beyond the channel-forming means, and means for securing the marginal portion of the blanket to said member around the channel-forming means.

4. Apparatus for molding plywood comprising a rigid die or mold member, means forming undercut channels along and inwardly of the margins of said member for receiving and lapping the margins of superposed sheets for forming the plies, wedges removably fitting in the channels for clamping the margins of the superposed sheets in the channels together and to said member as they are progressively assembled on said member, an elastic blanket fitting over the exposed face of the superposed plies and overlying and projecting beyond the channel-forming means, and means for clamping the marginal portion of the blanket to said member around the channel-forming means.

5. Appartus for molding plywood comprising a rigid die or mold member, bars projecting from and extending along the margins of and disposed inwardly of the edge of said member and forming channels along the inner side of the bars for receiving and lapping the margin of the superposed sheets, means forming inclined surfaces between the bars and said member along the outer side of the bars, removable wedges engageable with the bar and adapted to extend into the channel for clamping the superposed sheets together and to said member, and an elastic blanket fitting over the exposed face of the last superposed ply, extending over said bars and said inclined surface and lapped around the edges of the member projecting outwardly of the bars.

6. Apparatus for molding plywood comprising a rigid die or mold member, bars projecting from and extending along the margins of said member and disposed inwardly of the edge of said member and forming undercut channels along the inner sides of the bars for receiving and lapping the margin of the superposed sheets, means forming inclined surfaces between the bars and said member along the outer side of the bars, removable wedges engageable with the bars and adapted to extend into the channel for clamping the superposed sheets together and to said member, and an elastic blanket fitting over the exposed face of the last superposed ply, extending over said bars and said inclined surfaces and lapped around the edges of the member projecting outwardly of the bars.

RAYMOND L. BEASECKER.